United States Patent [19]

Nickel

[11] Patent Number: 5,202,986
[45] Date of Patent: Apr. 13, 1993

[54] PREFIX SEARCH TREE PARTIAL KEY BRANCHING

[75] Inventor: Steven P. Nickel, Cherry Valley, Mass.

[73] Assignee: Bull HN Information Systems Inc., Billerica, Mass.

[21] Appl. No.: 414,045

[22] Filed: Sep. 28, 1989

[51] Int. Cl.$^5$ .............................................. G06F 15/40
[52] U.S. Cl. ........................... 395/600; 364/DIG. 2; 364/974.3; 364/963; 364/960.5
[58] Field of Search ......................... 364/419; 395/600

[56] References Cited

U.S. PATENT DOCUMENTS

| | | | |
|---|---|---|---|
| 3,938,105 | 2/1976 | Lechner | 364/900 |
| 4,086,628 | 4/1978 | Woodrum | |
| 4,267,568 | 5/1981 | Dechant et al. | |
| 4,464,650 | 8/1984 | Eastman | 341/364 |
| 4,468,728 | 8/1984 | Wang | 364/900 |
| 4,611,272 | 9/1986 | Lomet | 364/200 |
| 4,611,298 | 9/1986 | Schuldt | |
| 4,677,550 | 6/1987 | Ferguson | 364/900 |
| 4,774,657 | 9/1988 | Anderson et al. | |
| 4,814,746 | 3/1989 | Miller et al. | 341/95 |
| 4,817,036 | 3/1989 | Millett et al. | 364/900 |
| 4,821,290 | 4/1989 | Hingorani et al. | |
| 4,868,743 | 9/1989 | Nishio | 364/200 |

OTHER PUBLICATIONS

"Fundamentals of Data Structures", by E. Horowitz & S. Sahni Computer Science Press, 1976 (pp. 214-249; 422-429; 440-443; 494-525; 536-541).
"Organization and Maintenance of Large Ordered Indexes", R. Bayer & E. MacCreight, *Acta Informatica,* vol. 1, 1972.
"Prefix B-Trees", R. Bayer and K. Unteraurer, *ACM Transactions on Database Systems,* vol. 2, No. 1, 1977 (pp. 11-26).
"Performance Comparison Between B*-Tree and Prefix Binary Tree Index Organizations", N. Phuc, M. Becker & P. Sevray, *Proceedings-Second International Conference on Databases,* John Wiley & Sons Ltd., 1983 (Chapter 19, pp. 358-376).

*Primary Examiner*—Gareth D. Shaw
*Assistant Examiner*—Kakali Chaki
*Attorney, Agent, or Firm*—Gary D. Clapp; Lewis P. Elbinger; John S. Solakian

[57] ABSTRACT

A prefix index tree structure for locating data records stored through keys related to information stored in data records. Each node includes a prefix field for a prefix string of length p of the longest string of key characters shared by all subtrees of the node and a data record field for a reference to a data record whose key is completed by the prefix string. A node may include one or more branch fields when the prefix string is a prefix of keys stored in at least one subtree of the node, with a branch field for each distinct $p+1^{st}$ key character in the keys, wherein each $p+1^{st}$ key character is a branch character. Each branch field includes a branch character and a branch pointer field for a reference to a node containing at least one key whose $p+1^{st}$ character is the branch character. Each node further includes a field for storing the number of key characters in the prefix string and a field for storing the number of branch fields in the node. Also disclosed are methods for constructing and searching a prefix index tree of the present invention, and for inserting nodes into the tree and deleting nodes from the tree.

1 Claim, 4 Drawing Sheets

PREFIX SEARCH TREE PARTIAL KEY BRANCHING

BACKGROUND OF THE INVENTION

1. Field of Use

The present invention relates generally to the indexing, or location, of information in a database through the use of keys and, in particular, to a prefix search tree for indexing a database.

2. Prior Art

A recurring problem in databases, in particular those implemented in computer systems, is the search for and location of specific items of information stored in the database. Such searches are generally accomplished by constructing a directory, or index, to the database, and using search keys to search through the index to find pointers to the most likely locations of the information in the database.

In its most usual forms, the index to a database is structured as a tree comprised of one or more nodes connected by branches. Each node generally includes one or more branch fields containing information for directing a search, wherein each such branch field usually contains a pointer, or branch, to another node, and an associated branch key indicating ranges or types of information may be located along that branch from that node. The tree, and any search of the tree, begins at a single node referred to as the root node and progresses downwards through the various branch nodes until the nodes containing either the items of information or, more usually, pointers to the items of information are reached. The information related nodes are often referred to as leaf nodes, or, because this is the level at which the search either succeeds of fails, failure nodes. It should be noted that any node within a tree is a root node with respect to all nodes dependent from that node, and such sub-structures within a tree are often referred to as sub-trees with respect to that node.

The decisions as to what directions, or branches, to take through a tree in a search is determined, at each node encountered in the search, by comparing the search key or keys and the branch keys stored in the node. The results of the comparisons determine which of the branches depending from a given node are to be followed in the next step of the search. In this regard, search keys are most generally comprised of strings of characters or numbers which relate to the item or items of information to be searched for. For example, "search", "tree", "trees" and "search tree" could be keys to search a database index for information relating generally to search trees while "617" and "895" could be keys to find all telephone numbers in the 895 exchange of the 617 area. The forms taken by the branch keys depend upon the type of search tree, as described briefly below.

The prior art contains a variety of search tree structures, among which is the apparent ancestor from which all later tree structures have been developed, and the most general form of search tree, the "B-tree" A B-tree is a multi-way search tree wherein each node is of the form $(A_0 K_0) \ldots (A_i K_i) \ldots (A_n K_n)$ and wherein each $A_i$ is a pointer to a subtree of that node and each $K_i$ is a key value associated with that subtree. All key values in the subtree pointed to by $A_i$ are less than the key value of $K_{i+1}$, all key values in subtree $A_n$ are greater than $K_n$, and each subtree $A_i$ may also be a multi-way search tree. The decision as to which branch to take at a given node is performed by comparing the search key $K_x$ to the branch keys $K_i$ of the node and following the pointer $A_i$ associated with the lowest value key $K_i$ which is larger than $K_x$; the search will follow pointer $A_O$ if $K_x$ is less than all keys $K_i$ and will follow pointer $A_n$ if $K_x$ is greater than key $K_n$.

The next variant on the basic B-tree is the Binary Tree wherein each node is of the general form $(A_i, K_i, A_{i+1})$ Each node of a Binary tree therefore contains only one branch key and two branches, so that there are only two ("binary") branches from any node. The leftmost branch $A_i$ is taken if search key $K_x$ is less than node key $K_i$ and the rightmost branch $A_{i+1}$ is taken if search key $K_x$ is greater than $K_i$.

The B'-tree and the B*-tree are similar to the B-tree except that in the B'-tree all information or pointers to information may be located only in the leaf nodes, that is, the lowest nodes of the tree, while in the B*-tree all failure nodes, that is, all leaf nodes, are at the same level in the tree. The B*-tree also has specific requirements on the maximum and minimum number of branches depending from the root and branch nodes.

The Bit Tree is again similar to the B-tree in its root and branch nodes, but differs in its leaf nodes in that the Bit Tree does not store keys in the leaf nodes. Instead, each pointer in a leaf node has associated with it a "distinction bit" which indicates the first bit in which the key for that branch differs from the branch key contained in the root, or next higher, node to that leaf node. Distinction bits are generated by comparing the binary expression for the branch key for a pointer in a leaf node with the binary expression for the node key of its root node and noting the binary number of the lowest order bit in which the two keys differ That number, which is actually the number of the distinction or difference bit, is then stored in the leaf node in association with the pointer. A search is conducted, at the leaf node level, by comparing the search key with the node key of the leaf's parent node and determining the lowest order bit in which the search key differs from the node key; the search then takes the leaf's pointer which is associated with the next lower order distinction bit.

The Trie is an index tree using variable length key values and wherein the branching at any level of the Trie is determined by only a part of the key, rather than by the whole key. Also, in a Trie the branching at any level is determined by the corresponding sequential character of the key, that is, the branching at the $j^{th}$ level of the trie is determined by the $j^{th}$ character of the key. Searching a Trie for a key value $K_n$ requires breaking $K_n$ into its component characters and following the branching values determined by those component characters. If, for example, the $K_n = $ LINK, then the branching at the first level is determined by the branch corresponding to component L, at the second level by component I, at the third level by N, and at the fourth level by K. This requires that, at the first level, all possible characters of the search keys be partitioned into individual, disjoint classes, that there be a first level branch for each class, and that the Trie contain a number of levels corresponding to the number of characters in the longest expected search key.

Finally, in a Prefix B-tree each node is again of the form $(A_0 K_0) \ldots (A_i K_i) \ldots (A_n K_n)$ and is searched in the same manner as a B-tree, but each key $K_i$ in a Prefix B-tree is not a full key but is a "separator", or prefix to a full key. The keys $K_i$ of each node in any subtree of a Prefix B-tree all have a common prefix, which is stored in the root node of the subtree, and each key $K_i$ of a node is the common prefix of all nodes in the subtree depending from the corresponding branch of the node. Again, there is a binary variant of the Prefix B-Tree, referred to as a Prefix Binary Tree, in which each node contains only one branch key and two branches, so that there are only two ("binary") branches from any node. The Prefix Binary Tree is searched in the same manner as a Binary Tree, that is, branching left or right depending on whether the search key is less than or greater than the node key. There are also, in turn, Bit Tree variants of the Prefix Binary Tree wherein distinction bits rather than prefixes are stored in the nodes. In particular, the values stored are the numbers of the bits in the keys which are different between two prefixes, thus indicating the key bits to be tested to determine whether to take the right or left branches.

The above described search trees of the prior art are generally intended to provide certain optimum characteristics for the most general cases of information searches and the most general types or classes of information. Certain trees may be designed, for example, to provide the minimum depth of tree so as to reduce the number of disk accesses required to bring successive nodes or groups of nodes into system memory, or to provide the minimum search time, or to equalize the search times for all searches, or to allow the easy insertion or deletion of nodes. The tree structures of the prior art do not, however, provide optimum structures for certain broad classes of information. For example, the prior art tree structures are generally not optimum in cases wherein the keys may be divided into rather large partitions, as is the case with certain types of information, and do not provide the optimum structures for creating and modifying search trees for such types of keys and information.

Yet another disadvantage of the tree structures of the prior art is that it is generally necessary to search completely to the data record level to determine whether or not a particular data item is present in the database. This is often described as a requirement that all failure nodes be at the same level in the tree. This disadvantage arises from the inherent search methodology as determined by the structure of the trees. As described, the search key is compared to the node keys to determine the branch paths having the range of key values most likely to contain a match with the search key. Because the search is based upon identifying the branches having ranges of key values, there is no point in the search short of the actual data records that a determination can be made as to whether a search key can actually be matched to a data record.

A solution to the above described problems of the prior art, and other problems, are provided by a prefix index tree of the present invention which is particularly adapted to those classes of information wherein the keys may be divided into rather large partitions. The tree structure of the present invention further provides an improved structure for creating and modifying search trees for such types of keys and information. The tree structure of the present invention further does not require that all searches continue to the data record level before it can be determined that a particular data item is not present in the database.

SUMMARY OF THE INVENTION

The tree structure of the present invention provides a prefix index tree structure for locating data records stored in a database in a data processing system through keys related to the information stored in the data records. Each node of the tree includes a prefix field for storing a prefix string of length p comprises of the longest string of key characters shared by all subtrees of then node and a data record field for storing a reference to a data record whose key is completed by the prefix string. The tree structure further includes one or more branch fields when the prefix string is a prefix of keys stored in at least one subtree of the node. There is a branch field for each distinct $p+1^{st}$ key character in the keys of the subtrees, wherein each distinct $p+1^{st}$ key character is a branch character. Each branch field includes a branch character field for storing the $p1^{st}$ character of a key and a branch pointer field for storing a reference to a node of a subtree containing at least one key whose $p1^{st}$ character is the branch character.

In further embodiments of the present invention, each node further includes a field for storing a number equal to the number of key characters in the prefix string, and a field for storing a number equal to the number of branch fields in the node.

The present invention further includes methods for constructing and searching a prefix index tree of the present invention, and for inserting nodes into the tree and deleting nodes from the tree.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE PREFERRED EMBODIMENTS

A. General Description of a Tree in a Data Processing System (FIG. 1)

Figure 1:
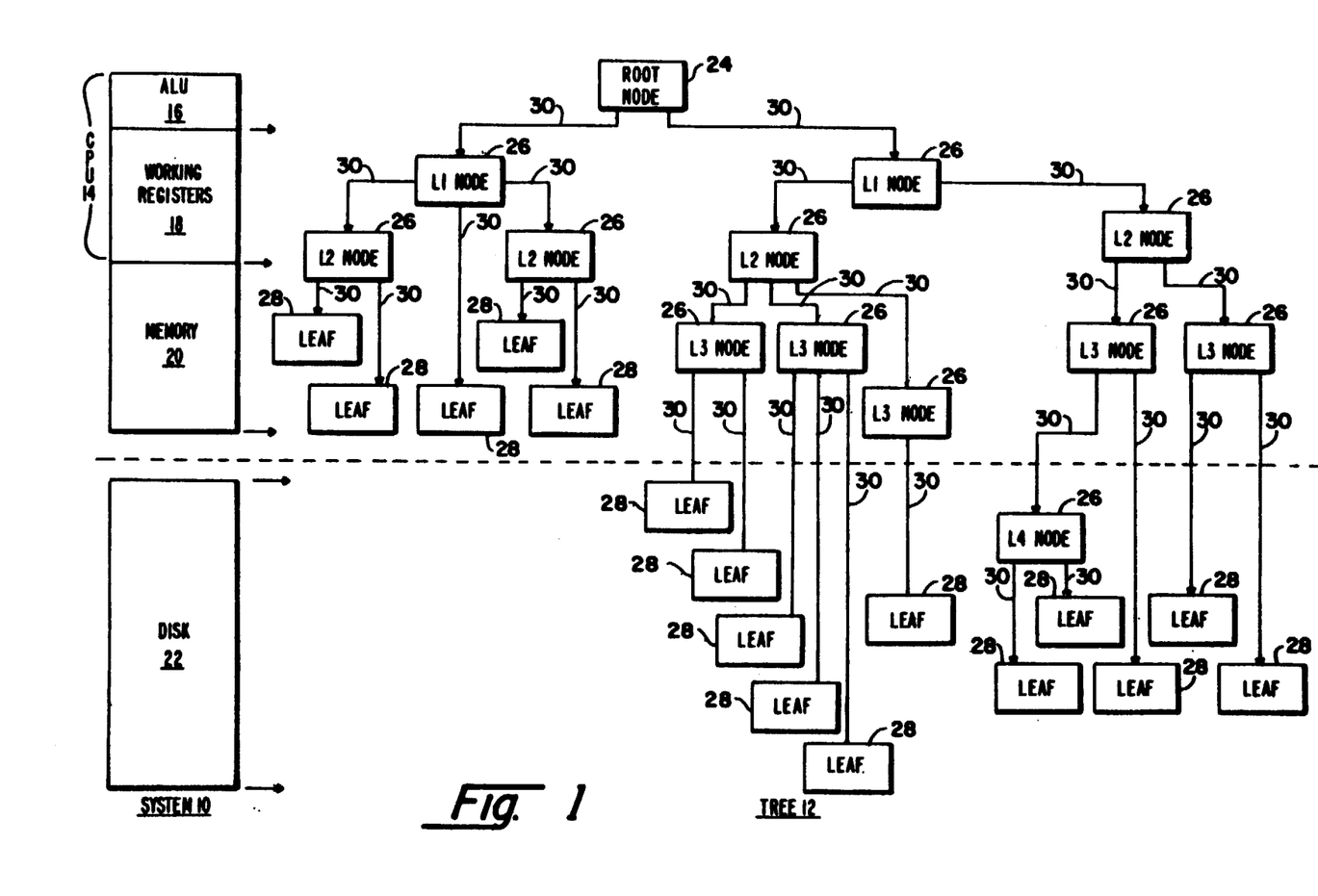
FIG. 1 is a diagrammatic representation of a data processing system and an index tree resident therein.

Referring to FIG. 1, therein is an illustrative representation of a Data Processing System 10 and an Index Tree 12, with Tree 12 arranged to illustrate the residence of Tree 12 in the addressable memory space of System 10. System 10 is comprised of a Central Processing Unit (CPU) 14, which is in turn comprised of an Arithmetic and Logic Unit (ALU) 16 with associated Working Registers 18, a directly addressable Memory 20, which may also include a cache memory, and associated storage in the form of a Disk 22.

Tree 12 is represented as having a single Root Node 24 and a plurality of Branch Nodes (Node) 26 and Leaf Nodes (Leaf) 28, all connected through Pointers, or branches, 30. As indicated, the Branch Nodes 26 are further designated according to their levels in Tree 12, that is, according to their depth in Tree 12 and, correspondingly, the number of nodes that must be traversed to reach a given node. In this illustration of a tree, there are two Level 1 Branch Nodes, each designated as a L1 Node 26, several Level 2 and Level 3 Branch Nodes, each respectively designated as a L2 Node 26 or a L3 Node 26, and a single Level 4 Branch Node, designated as L4 Node 26.

Tree 12 is positioned relative to System 10 in FIG. 1 to illustrate the locations of the various elements of Tree 12 in System 10's address space, and arrows extend rightwards from System 10 to indicate the boundaries of the various regions of System 10's address space. For example, at the start of a search, as illustrated in FIG. 1, Root Node 24 would most probably be located in Working Registers 18 of System 10's CPU 14, and thus would be directly accessible to ALU 16, as would one or more of the L1 Nodes 26 and possibly one or more of L2 Nodes 26. Further of Nodes 26 and perhaps certain of Leafs 28 would be found in Memory 20, while the deeper nodes of Tree 12 would be found stored as files in Disk 22.

The locations of the various Tree 12 nodes in System 10's address space effects the specific forms taken by the nodes and by the Pointers 30 stored therein. For example, and as will be described in the following detailed description of a Tree 12 according to the present invention, each node is always of the same basic form, that is, a set of fields containing specific types of information in a specific format. Nodes residing in Working Registers 18, however, are located in specific registers while nodes located in Memory 20 reside in physical memory locations which may be dynamically reassigned and which are located through logical addresses. Nodes residing in Disk 22 will reside in disk files. Correspondingly, the Pointers 30 to nodes residing in Working Registers 18 may take the form of logical address pointers, or more likely, specific ALU 16 register identifications. Pointers 30 to nodes located in Memory 20 will take the form of logical address pointers which are translated, by System 10, to Memory 20 physical addresses when their corresponding nodes are to be accessed. Pointers 30 to nodes residing in Disk 22 will be in the form of file references. It should be noted, however, that while the specific forms of the information contained in the fields of a node may change with the location of the node in System 10's address space, the functional and structural and logical relationships of the various elements of the nodes of Tree 2 remain the same.

The locations of the nodes in System 10's address space also affect the speed with which System 10 may access the nodes and process the information contained therein, and correspondingly the speed with which System 10 may perform a search. For example, the nodes residing in Working Registers 18 are directly accessible to ALU 16 and may be processed in correspondingly little time. The nodes residing in Memory 20 and in any associated cache memory are also relatively quickly accessible to CPU 14, requiring only the delay of a logical to physical address translation and a memory access cycle to be read into Working Registers 18 as the search progresses. The access time to the nodes of Tree 12 become greater, however, the deeper into Tree 12 the search progresses. In particular, the nodes residing in Disk 22 require a disk access operation and a file read to be transferred into Memory 20, and a subsequent transfer into Working Registers 18. It is therefore advantageous that Tree 12 be as "flat" as possible, that is, contain as high a degree of branching as possible, to move the nodes up towards the root node to decrease the node access time, and, in particular, reduce the number of disk accesses required to search Tree 12. It is also advantageous to move the Leaf Nodes 28 up into Tree 12's structure as far as possible, rather than requiring all Leaf Nodes 12 to reside at the same, and lowest, level of Tree 12. As will be described next below, the Tree 12 of the present invention provides an approach to providing these advantages for certain broad classes of information.

Figure 2:
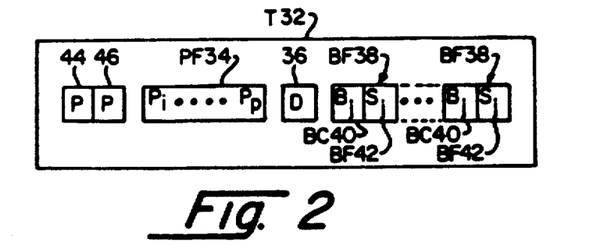
FIG. 2 is a diagrammatic representation of a node of a tree of the present invention.
Figure 3:
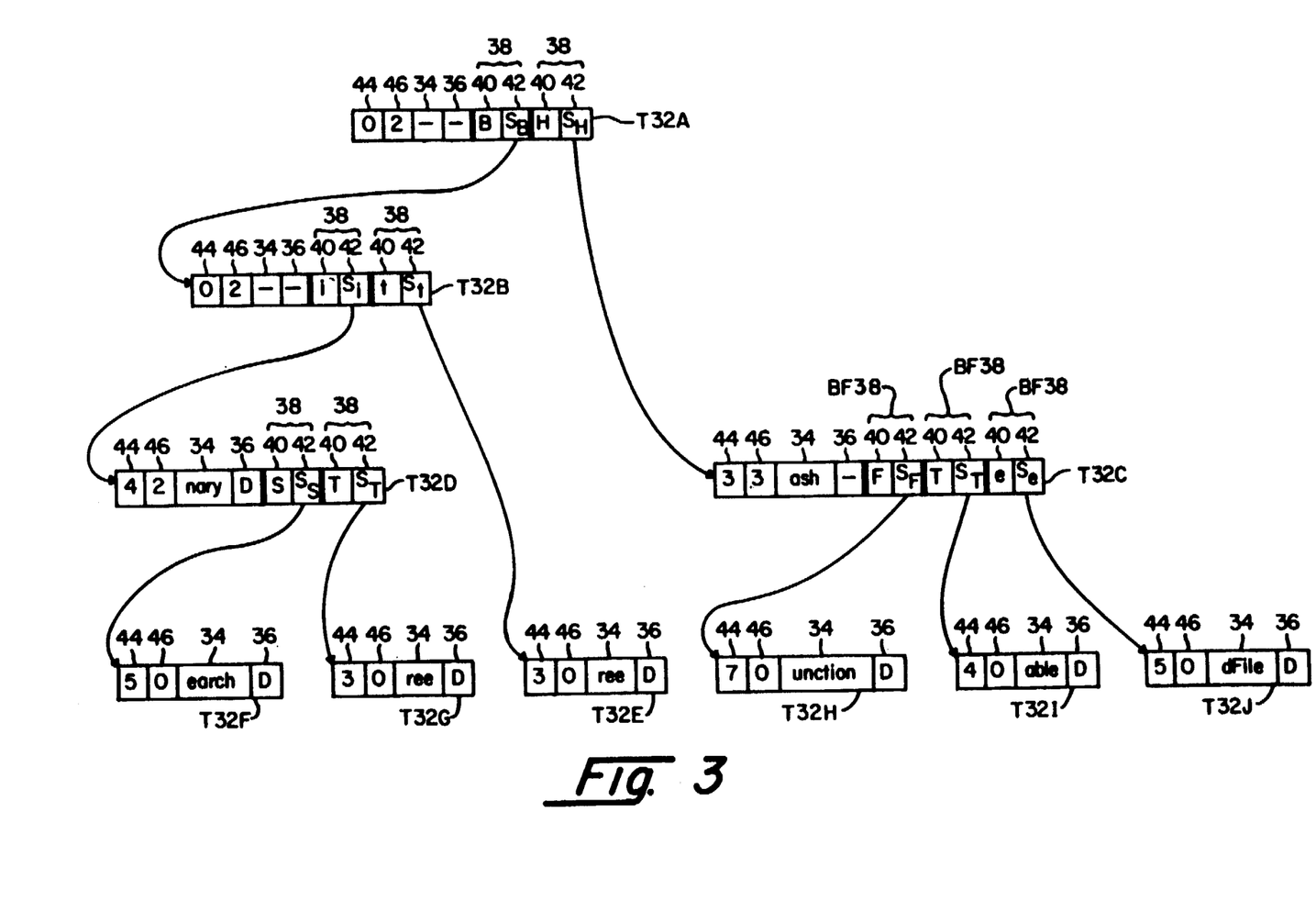
FIG. 3 is a diagrammatic illustration of a tree of the present invention.

B. Description of a Tree of the Present Invention (FIGS. 2 and 3)

A Tree 12 of the present invention is designed for use wherein the keys may be placed into suitably large partitions determined by leading characters shared with other keys. Tree 12 is a dense index structure using variable length, character oriented keys. Branching at any level is determined by a part of the key, rather than by the whole key, and the structure of the Tree 12 is independent of the order in which the Tree 12 is constructed.

A Tree 12 of the present invention is a prefix search tree that is either empty or is of height greater than or equal to one, that is, contains one or more levels, and satisfies the following properties:

(i) Any node, T, of the tree is of the form and type $$p, s, (P_i \ldots P_p), D, ((B_i, S_i) \ldots (B_s, S_s))$$

where the $P_i$, $0 < i <= s$, represent the prefix string, the tuples $(B_i, S_i)$, $0 < i <= s$, are branch characters and subtrees of T, respectively, and D is a pointer to a data record;

(ii) The prefix $(P_i \ldots P_p)$ contains the longest string of leading characters shared by every key contained in T (and the subtrees dependent from T);

(iii) D is a pointer to the record with the key of length p, or is a null if there is no such key;

(iv) Each $B_i$, $0 < i <= s$, is a distinct character which is the $p+1^{st}$ character of some key in T, that is, of a subtree dependent from T, whose length is greater than p;

(v) $B_i < B_{i+1}$, $0 < i < s$;

(vi) Each $S_i$ is a pointer to a prefix search tree dependent from T; and, (vii) The keys in a subtree referenced by a $S_i$, $0 < i <= s$, are formed from the set of keys in T having $B_i$ as their $p+1^{st}$ character, by removing their initial $p+1$ characters.

Referring to FIG. 2, therein is represented a diagrammatic illustration of the structure and format of a single node (T) 32 of a Tree 12 of the present invention according to the definition presented above. As shown, T 32 may contain a Prefix Field (PF) 34 which contains a prefix of length p $(P_l \ldots P_p)$ comprised of the longest string of characters shared by all keys of every subtree dependent from node T 32, and a Data Pointer Field (D) 36 which contains a Pointer 30 to a data record having the key $(P_l \ldots P_p)$, if there is such a key and data record. T 32 may also contain one or more Branch Fields (BFs) 38, each of which is comprised of a Branch Character Field (BC) 40 for storing a branch character $B_j$ and a Branch Pointer Field (BP) 42 for storing a corresponding branch pointer $S_j$. As described, each $B_j$ is the $p+1^{st}$ character of a key of length greater than p of a subtree dependent from T 32 while each associated $S_j$ is a pointer to the node T 32 of that subtree. Finally, each node T 32 will include a p Field 44 and an s Field 46 containing, respectively, the length, or number of characters, in the prefix stored in PF 34 and the number of subtrees (or data records) dependent from the node T 32, that is, the number of BF 38's contained in the node T 32. Although p Fields 44 and s Fields 46 are not a necessary part of the structure of nodes T 32, these fields are provided to assist System 10 in processing the nodes. That is, it is more efficient to inform the processor as to the length of the prefixes contained in the PF 36s and the number of Branch Fields 38 than to have the system extract this information from the PF 36s and BF 38s.

As will be described below with reference to FIG. 3, certain nodes of a Tree 12 of the present invention may be "leaf" nodes, which are identical in structure to the branch nodes T 32 except that they contain no Branch Fields 38 as the branches are nulls.

Referring to FIG. 3, therein is a diagrammatic illustration of a Tree 12 of the present invention using the key values "Btree", "Binary", "BinarySearch", "BinaryTree", "HashTable", "HashFunction", and "HashedFile".

It is apparent from an examination of the keys used for this example that the Tree 12 of FIG. 3 will have two branches, or subtrees, dependent from the root node. One branch will contain nodes for the keys having the initial character "B" (Btree, Binary, BinarySearch, and Binary Tree) and other for the nodes for the keys having the initial character "H" (HashTable, HashFunction and HashedFile). Accordingly, PF 34 of root node T 32A will be null as there is no common prefix shared between the keys starting with "B" and the keys starting with "H", and T 32A's D field 36 will also be a null as there are no data records dependent from T 32A. T 32A will contain a first BF 38 field for the T 32A subtree containing all keys having an initial character "B" and a second BF 38 field for those keys having initial, character "H". Considering the first BF 38 field, the BC 40 field $B_j$ character in this field will be the character "B" as "B" is the p+1$^{st}$ character of the keys of the corresponding subtree of T 32A and the BP 42 field will contain an $S_j$ pointer $S_B$ to the first node in this subtree, T 32B. The second BF 38 field of T 32A will contain the character "H" as its $B_j$ in the BC 40 field as this is the p+1$^{st}$ character of the keys of the corresponding subtree, and the $S_j$ pointer in the BP 42 field will be a pointer $S_H$ to the first node in this subtree, T 32C. The p field 44 and s field 46 of T32A will respectively contain a 0 to indicate that the PF 34 field of T 32A contains no prefix characters, that is, is a null, and a 2 to indicate that T 32A has two "children", that is, that there are two branches from T 32A.

Considering T 32B, the next branch in the keys having initial character "B" will occur between the key "Btree", having "t" as the its second character, and the keys having "i" as their second character (Binary, BinarySearch and BinaryTree). There are no common prefix characters shared between the keys branching from this node, so that T 32B's PF 34 field will contain a null, as will T 32B's D field 36. T 32B will again have two BF 38s, with the first having a $B_j$ of "i" and the second having a $B_j$ of "t", "i" and "t" being the p+1$^{st}$ characters of the keys of the subtrees dependent from node T 32B. The corresponding $S_j$ pointers will be pointers $S_i$ and $S_t$ to, respectively, nodes T 32D and T 32E. The p Field 44 and s Field 46 of T 32B will respectively contain a 0, indicating that the PF 34 field contains no prefix characters, and a 2, indicating that T 32B has two children, or branches.

Next considering T 32E, this node contains a reference to a data record, but no further branches to further nodes. As such, the PF 38 fields of T 32E contain nulls, that is, the node contains no PF 38 fields. The PF 34 field of T 32E contains the final portion of the key for the associated data record, the character string "ree" in the case of T 32E, and a D field 36 containing a pointer to the data record. The p Field 44 and s Field 45 respectively contain a 3, indicating that the PF 34 field contains three characters, and a 0, indicating that Leaf 48A has no branches to subtrees.

Next considering T 32D, the other node dependent from node T 32B, the subtree of which T 32D is the root node contains the keys "Binary", "BinarySearch" and "BinaryTree", wherein the prefixes "B" and "i" of these keys are stored as prefixes in the PF 34 fields of, respectively, T 32A and T 32B. The longest prefix common to the remaining portions of these keys, that is, to "nary", "narySearch" and "naryTree" is the character string "nary". As such, the character string "nary" is stored as a prefix in the PF 34 field of T 32D.

Of the three keys in this subtree, all three keys differ in the next character following "nary" and T 32D could thus have three branches. "nary" is, however, the final portion of the key "Binary", so that, rather than resulting in a branch to another node, the key "Binary" results in a pointer to the data record associated with the key "Binary" being written into the D field 36 of T 32D.

The keys "BinarySearch" and "BinaryTree", however, have remaining character strings following "nary" and thus result in branches from T 32D. The p+1$^{st}$ character of "BinarySearch" is "S", so that "S" appears as the $B_j$ of a first BF 38, together with an $S_j$ pointer $S_S$ to the associated node T 32F in the BP Field 42. The p+1$^{st}$ character of "BinaryTree" is "T", so that "T" appears as the $B_j$ of the second BF 38, together with an $S_j$ pointer $S_T$ to the associated node T 32G in the BP Field 42. The p Field 44 and s Field 46 of T 32D respectively contain a 4, to indicate that the PF 34 field contains a string of 4 characters, and a 2, to indicate that there are two branches from T 32D.

T 32F and T 32G are both similar to T 32E in that these nodes contain no further branches to other nodes, and thus have null, or empty, BF 38 fields, but pointers to associated data records in their respective D 36 fields. The PF 34 field of T 32F contains the character string "earch", which is the final portion of the key "BinarySearch", while the PF 34 field of T 32G contains the character string "ree", which is the final portion of the key "BinaryTree". The p Field 44 of T 32F contains a 5, for the five characters in "earch" and the p Field 44 of T 32G contains a 3, for the three characters in "ree", while the s Field 46 of each node contains a zero, indicating that there are no branches from either node.

Referring briefly to the right hand subtree of Tree 12, comprised of nodes T 32C, T 32H, T 32I and T 32J, this subtree is constructed by the same principle as just described above. The keys contained in this subtree are "HashTable", "HashFunction" and "HashedFile" and the character "H" of all three keys appears as the $B_j$ of the corresponding PF 38 of T 32A as the p+1$^{st}$ character of the prefix appearing in PF 34 of T 32A. As previously described, PF 34 of T 32A contains a null character string as there is no common prefix character string between the two branches dependent from T 32A.

The longest prefix string common to the remaining portions of these keys, that is, to "ashTable", "ashFunction" and "ashedFile" is the string "ash" and "ash" accordingly appears in the PF 34 field of T 32C. Because there are three keys having a the common prefix string "ash", there will b three branches from T 32C. The p+1$^{st}$ characters of the remaining portions of these three keys are, after removing "ash", respectively, "T", "F" and "e". "T", "F" and "e" accordingly appear as the B$_j$s in the BF 38s of T 32C, together with corresponding S$_j$ pointers S$_F$, S$_T$ and S$_e$ to nodes T 32H, T 32G and T 32H. The p Field 44 and s Field 46 of T 32C respectively contain a 3, to indicate a character string of three characters in PF 34, and a 3, to indicate that there are three branches from T 32 C.

Nodes T 32H, T 32G and T 32I are again "leaf" nodes in that they contain pointers to data records in their D fields 36, but no further branches and correspondingly no BF 38s. The PF 34 field of T 32G contains the string "unction", which is the remaining portion of key "HashFunction", while the PF 34 fields of T 32G and T 32H respectively contain "able" and "dFile", the final portions of keys "HashTable" and "HashedFile". The s Fields 46 of each of these nodes contain 0s, as there are no branches from these nodes. The p Fields 44 of these nodes respectively contain a 7, a 4 and a 5, representing the number of characters in the remaining portions of the keys stored in their PF 34 fields.

C. Searching of a Tree 12

In order to search for any given key value in the Tree 12 of the present invention, System 10 begins at the root node and proceeds through the Tree 12, node by node, as described in the following, until the search either reaches a failure node, that is, a node which has no match for the search key, or succeeds by finding the data record corresponding to the search key.

Starting in the root node, the system compares the search key (K), which has a length, or number of characters, k, to the prefix character string (P), which has a length p, stored in the PF 34 of the node to determine whether the prefix matches at least the initial characters of the search key. That is, to determine whether $K >= P$ and $K_i = P_i$ for some $i <= p$. In this regard, it should be noted that if the prefix $P=0$, that is, if P is a null string, then zero characters of the search key and prefix are considered matched.

If there is a complete match between search key K and prefix P, that is, $P=K$, then the corresponding data record is pointed to by the pointer stored in the D field 36 of the node.

In there is a match between the prefix character string, which has a length p, and the first p characters of the search key character string, then the system searches the B$_j$ s of the BC 40 fields of the BF 38's to find a B$_j$ which matches the p+1$^{st}$ character of the key K ($K_{p+1}$). If the search finds no $B_j = K_{p+1}$, then the key value is not contained in the tree and the search has failed.

If the search finds a $B_j = K_{p+1}$, then the search follows the associated S$_j$ pointer to the corresponding next node and continues the search. It will be remembered, however, that the prefix for each succeeding node in the tree is comprised of the longest prefix string common to the remaining portions of the keys after removal of the leading prefix characters which have been incorporated into the prefixes of previous nodes. In a like manner, the key used to search a next node of the tree has a new key value of $K_{p+2} \ldots K_k$, that is, is comprised of the portion of the search key remaining after removal of the leading key characters which have been matched to prefixes and branch characters in previous nodes.

Further description of the searching of a tree of the present invention may be found in the following exemplary Search Program Listing A:

---

PROGRAM LISTING A - TREE SEARCH

```
procedure PSEARCH (T,(K₁..Kₖ))
   // Search the prefix search tree T residing on
      disk for the key value (K₁..Kₖ). A tuple
      (i,d) is returned; i is false if K does not
      exist. Otherwise i is true and d is the data
      record pointer //
   if (T=0) then return(FALSE,0) // special case: tree
      is empty //
   X=T; n=0
   loop
      input node X from disk
      let X define p,s,(P₁..Pₚ),D,((B₁,S₁)
         ..(Bₛ,Sₛ))
      // if the prefix is too long, can't possibly
         match the key //
      if n+p>k then return(FALSE,0)
      // match the prefix to the leading characters
         in the key //
      for i=1 to p do
         n=n+1
         if Kₙ<>Pᵢ then return (FALSE,0)
      end
      // determine if this node contains the key //
      if n=k then (if D=null then return(FALSE,0)
         else return (TRUE,D))
      // determine which node to process next.
         Search branch characters //
      n=n+1
      j=1
      loop
         case
            :j>s:return(FALSE,0)
            :Kₙ<Bⱼ:return(FALSE,0)
            :Kₙ=Bⱼ:exit
            :else:j=j+1
         end
      forever
      X=Sⱼ
   forever
end PSEARCH
```

---

Figure 4A:
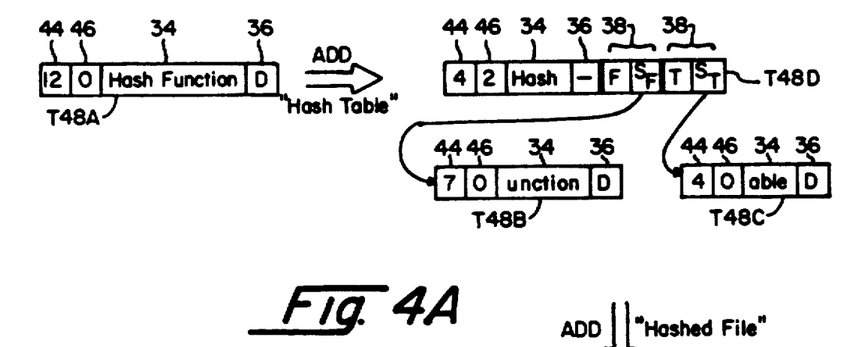
FIGS. 4A, 4B and 4C are illustrations of the insertion of nodes into a tree; and, FIG. 5 is an illustration of the deletion of nodes from a tree.
Figure 4B:
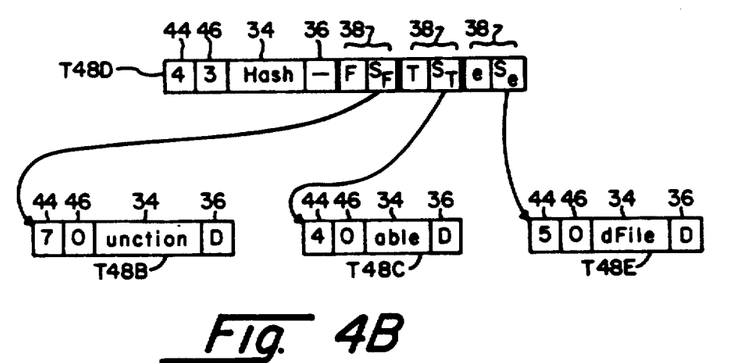
Figure 4C:
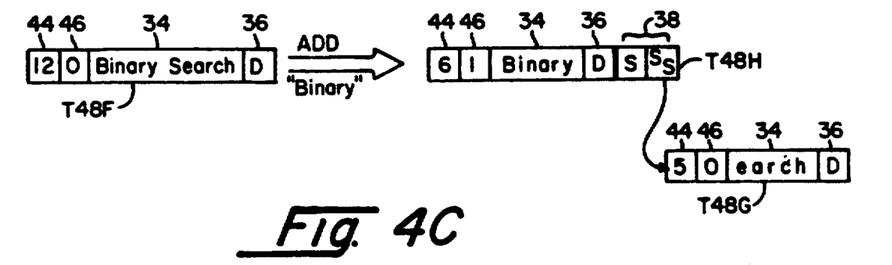

D. Construction of a Tree and Insertion of Nodes (FIGS. 4A, B and C)

The construction of a Tree 12 is performed in and by the same manner and method as is used to insert new nodes into an existing tree, except that the initial node of a new tree is inserted into an otherwise empty tree. For this reason, the following discussion will describe the insertion of nodes into an existing tree, with the understanding that the description applies equally to the construction of new trees.

There are five general conditions requiring the insertion of a new node into a Tree 12:

(a) A mismatch occurs between a prefix and a new key before the end of either character string, a condition referred to as a "prefix collision";

(b) A new key is longer than the prefix in question and the key matches for the entire length of the prefix but there are either no branch characters or the next character in the key after the last character of the prefix is not among the branch characters, a condition referred to as a "branch collision";

(c) A new key is shorter than the prefix in question, and the prefix and the key match for the entire length of the key, a condition referred to as an "initial substring";

(d) The length of a new key is equal to that of the prefix in question, and the key and the prefix match, but there is no data associated with the prefix, a condition referred to as a "data collision"; and, (e) The tree is empty.

Considering first the instance of a prefix collision, a prefix collision requires the creation of three nodes to replace the node where the collision occurred, one to replace the previously existing node and two nodes dependent from that node. Of the two new dependent nodes, one will contain the portion of the key occurring beyond the character which caused the match to fail and the other will contain the portion of the prefix occurring beyond the character which caused the match to fail. The third node, which is the replacement for the original node, will contain the portion of the original prefix which matched with the key and will include two branches and, correspondingly two BF 38s. One BF 38's $B_j$ will be the character of the prefix which caused the match to fail and the associated $S_j$ will point to the new subnode containing the remaining portion of the original prefix. The other BF 38's $B_j$ will be the character of the key which caused the match to fail, and the associated $S_j$ will point to the new subnode containing the remaining portion of the key.

This operation is illustrated in FIG. 4A, wherein the new key "HashTable" is to be added to a tree at a node T 48A containing the prefix "HashFunction". The initial character strings "Hash" of the original prefix and the new key match, but the match fails at the "F" of the original prefix and the "T" of the new key. A first new subnode T 48B is created whose PF 34 contains the portion of the original prefix occurring after the prefix failure character, that is, the string "unction" which follows the prefix failure character "F". Original node T 48A had a D Field 36 pointer to a data record, so that new first subnode T 48B also has a D Field 36 pointer to that same data record. If node T 48A had contained a Field BF 38, this would then appear in the new subnode T 48B.

The second new subnode T 48C contains in its PF 34 the portion of the key occurring after the key failure character, that is, the string "able" which follows the key failure character "T". Second new subnode T 48C will also contain a D Field 36 pointer to the data record associated with the key "HashTable".

Finally, new node T 48D which replaces original node T 48A has the string "Hash" in its PF 34, that is, the portion of the prefix and key strings which matched. A first BF 38 of new node T 48D contains a $B_j$ of "F", that is, the prefix character which failed in the match, and an associated $S_j$ pointer to the new subnode having the prefix "unction", the remaining portion of the original prefix. A second BF 38 of new node T 48D contains a $B_j$ of "T", that is, the key character which failed in the match, and an associated $S_j$ pointer to the new subnode having the prefix "able", the remaining portion of the key. Although original node T 48A had a D Field 36 pointer to a data record, this pointer now appears in first subnode T 48B, so that this replacement for original node T 48A has no D Field 36 pointer.

Next considering the case of a branch collision, a branch collision requires the creation of two nodes to replace the original node where the collision occurred. One node will be a subnode which will contain in its PF 34 the portion of the key occurring beyond the character which was not found among the branch characters $B_j$ of the original node. The other new node will contain the prefix, branch characters and subtrees of the original node in which the branch collision occurred, with the addition of a branch character $B_j$, the new branch character being the key character which was not found as a branch character in the original node. Associated with this new branch character will be an $S_j$ pointer to the new subnode.

This operation is illustrated in FIG. 4B, wherein the new key "HashedFile" is to be added to the tree resulting from the operation illustrated in FIG. 4A. The new key "HashedFile" is longer than prefix "Hash" of node T 48D and matches the entire prefix. The next character of the key, "e", however, is not found in the BF 38s of T 48D. Accordingly, a new node T 48E is created containing, as a prefix in its PF 34, the key character string "dFile", which is the portion of the key after unfound branch character "e". A corresponding new BF 38 is created for T 48D with branch character "e" and an associated $S_j$ pointer to new node T 48E. It should be noted that new node T 48E contains a D Field 36 pointer to the data record associated with key "HashedFile" and that nodes T 48B and T 48C remain unchanged.

Considering the instance of an initial substring, when an initial substring is encountered two nodes are created to replace the node where the collision was detected. The first node will contain, in its PF 34, the portion of the prefix which was not matched by the key, minus its initial character, together with the subtrees and branch characters of the original node. The other node will contain, in its PF 34, the portion of the prefix which was matched by the key, with the initial character of the unmatched portion of the key as its sole branch character and an associated $S_j$ pointer to the first node, which will be a subnode of this second node.

This operation is illustrated in FIG. 4C, wherein the key "Binary" is to be added to node T 48F which has prefix "BinarySearch" and a D Field 36 pointer to a data record. The "Binary" characters strings of both the key and the prefix match, while the "Search" portion of the prefix is not matched by the key. Accordingly, a new node T 48F is created having the string "earch" as its prefix, that is, the portion of the original prefix which was not matched by the key, minus its initial character, "S". T 48F also has a D Field 36 pointer to the data record originally associated with original node. If T 48F had branch characters and branch pointers to other nodes of the tree, these branch characters and pointers would be replicated in the new node T 48G. The second new node T 48H is created with a prefix of "Binary", that is, the portion of the original prefix which was matched by the key, and a single branch character "S", which is the initial character of the portion of the original prefix which was not matched by the key. Associated with branch character "S" will be a $S_j$ pointer to the new node T 48G and T 48H will contain a D Field 36 pointer to any data record associated with the key "Binary".

Finally, there are the cases of a data collision and an empty tree. As described, in a data collision the length of a new key is equal to the length of the prefix and the key and prefix match but there is no data associated with the prefix. Data collisions are handled simply by adding the data to the node and rewriting the node with a D Field 36 pointer to the data record.

The instance of an empty tree is similarly straightforward. The system creates an initial node by selecting a suitable root node prefix for the tree, for example, by selecting a set of keys providing the longest common prefix, and proceeds to add further nodes according to the methods described above.

Further description of the above node insertion methods will be found in the following exemplary Insert Program Listing B:

PROGRAM LISTING B - NODE INSERT

```
procedure PINSERT(T,(K₁..Kₖ),d)
    // Insert the key value (K₁..Kₖ) into the
       prefix search tree T, with data record pointer
       d. False is returned if d is null or if the
       key value already exists. Otherwise, true is
       returned //
    if(d=null) then return(FALSE)      // special case: d is
                                           null //
    if(T=null)                          // special case: tree
       is empty //
        then (T=MAKENODE((K₁..Kₖ),d,()); return
        (TRUE))
    X=T;Y=null;y=0;n=0;j=0
    loop
        input node X from disk
        let X be defined by (P₁..Pₚ),D,
            ((B₁,S₁)..(Bₙ,Sₛ))
        // match the prefix to the leading
           characters in the key //
        l=MIN(p,k-n)
        for i=1 to l do
            n=n+1
            if Kₙ<>Pᵢ then return (PREFIX(d,
                n,(K₁..K₁),i,X,y,Y))
        end
        // is the new key a subset of an existing
           key? //
        if n=k then {
            if l=p then {
                if D<>null then return(FALSE)
                // trivial case; replace null
                   pointer with d //
                D=d; output X to disk; return
                (TRUE) }
            return(SUBSTRING(d,n,(K₁..Kₖ),
                l+1,X,y,Y)) )
        // determine which node to process next.
           Search branch characters //
        n=n+1
        y=j;j=1
        loop
            case
                :j>s:return(BRANCH(d,n,(K₁..
                    Kₖ),j,X,y,Y))
                :Kₙ<Bⱼ:return(BRANCH(d,n,
                    (K₁..Kₖ),j,X,y,Y))
                :Kₙ=Bⱼ:exit
                :else:j=j+1
            end
        forever
        Y=X;X=S
    forever
```

INSERT FOR PREFIX COLLISION

```
procedure PREFIX(d,n,(K₁..Kₖ),i,X,y,Y)
    // collision has occurred within the prefix
       portion of a node. Three new nodes will be
       formed, U, V, and W, replacing the node in
       which the conflict occurred, X. Kₙ and Pᵢ
       were the conflicting characters.
       y is the subtree in Y, the parent node of X,
       which points to X //
    // assume X,Y are already in memory
       let X define p,s,(P₁..Pₚ),D,((B₁,S₁)
            ..(Bₙ,Sₛ))
       let Y define Yp,Ys,(YP₁..YPₚ),YD,
```

INSERT FOR PREFIX COLLISION -continued

```
            ((YB₁,YS₁)..(YBₙ,YSₛ)) //
    // create new node U to hold remainder of new key
       and its data //
    U+MAKENODE((Kₙ₊₁..Kₖ),(d),())
    // create new node V to hold remainder of prefix
       and subtrees //
    V=MAKENODE((Pᵢ₊₁..Pₚ),(D),((B₁,S₁)
        ..(Bₛ,Ss)))
    // create new node W to hold common prefix and new
       subtrees //
    if Kₙ<Pᵢ
        then W=MAKENODE((P₁..Pᵢ₋₁),(),((Kₙ,U),
            (Pᵢ,V)))
        else W=MAKENODE((P₁..Pᵢ₋₁),(),((Pᵢ,V),
            (Kₙ,U)))
    // replace pointer to X in Y with pointer to W,
       then destroy X //
    if Y=null
        then T=W
        else {YSᵧ=W;output Y to disk}
    KILLNODE(X); return(TRUE)
end PREFIX
```

INSERT FOR BRANCH COLLISION

```
procedure BRANCH(d,n,(K₁..Kₖ),j,X,y,Y)
    // a collision has occurred within the branch
       portion of a node. Two new nodes will be
       formed, U and W, replacing the node in which
       the conflict occurred, X. Kₙ was the
       character not found in (B₁..Bₛ).
       j provides the insertion point. y is the
       subtree in Y, the parent node of X, which
       points to X //
    // assume X,Y are already in memory
       let X define p,s,(P₁..Pₚ),D,((B₁,S₁)
            ..(Bₙ,Sₛ))
       let Y define Yp,Ys,(YP₁..YPₚ),YD,((YB₁,
            YS₁)..(YBₙ,YSₛ)) //
    // create new node U to hold remainder of new key
       and its data //
    U=MAKENODE((Kₙ₊₁..Kₖ),(d),())
    // create new node W to hold remainder of prefix
       and subtrees //
    W-MAKENODE((P₁..Pₚ),(D),((B₁,S₁)..(Bⱼ₋₁,
        Sⱼ₋₁),(Kₙ,U),(Bⱼ,Sⱼ)..(Bₙ,Sₛ)))
    // replace pointer to X in Y with pointer to W,
       then destroy X //
    if Y=null
        then T=W
        else {YSᵧ=W;output Y to disk}
    KILLNODE(X);return(TRUE)
end BRANCH
```

INSERT FOR INITIAL SUBSTRING

```
procedure SUBSTRING(d,n,(K₁..Kₖ),i,X,y,Y)
    // an underflow has occurred within the pre-
       fix portion of a node. Two new nodes will
       be formed, V and W, replacing the node in
       which the key was exhausted, X. Pᵢ
       WOULD be the next character examined. y
       is the subtree in Y, the parent node of X,
       which points to X //
    // assume X,Y are already in memory
       let X define p,s,(P₁..Pₚ),D,
            ((B₁,S₁)..(Bₙ,Sₛ))
       let Y define Yp,Ys,(YP₁..YPₚ),YD,
            ((YB₁,YS₁)..(YBₙ,YSₛ)) //
    // create new node V to hold remainder of
       prefix and subtrees //
    V=MAKENODE((Pᵢ₊₁..Pₚ),(D),((B₁,S₁)..
        (Bₛ,Ss)))
    // create new node W to hold common prefix
       and new subtree //
    W=MAKENODE((P₁..Pᵢ₋₁),(d),((Pi,V)))
```

-continued

INSERT FOR INITIAL SUBSTRING

```
// replace pointer to X in Y with pointer to
        W, then destroy X //
    if Y=null
        then T=W
        else {YS_y=W;output Y to disk}
    KILLNODE(X);return(TRUE)
  end SUBSET
end PINSERT
```

E. Deletion of Nodes

The first step in deleting a node containing a given key which is to be deleted is to locate the node, which requires matching the key to the prefix completely, and determining whether there is data associated with the node. Thereafter, the deletion of the node depends upon the number of branch characters, that is, the number of branches, dependent from the node.

In a first instance, there are no branch characters $B_j$ in the node. That is, the node is a "leaf" node and there are no other keys in the search tree formed by this node and its subtrees. In this case, the node having the prefix which completely matches the key to be deleted is deleted and the subtree pointer and associated branch character which point to this node are removed from the parent node, that is, from the node containing the pointer to the node being deleted.

In the next case there is exactly one branch character in the node to be deleted. That is, the prefix matching the key occurs as the leading characters of at least one other key held in the search tree formed by the node to be deleted and its subtrees. The node to be deleted effectively operates as a placeholder for the key and all other branch points for other keys held in the tree formed of that node and its subtrees appear in the nodes of the subtrees dependent from that node.

This key is deleted by first deleting the data record associated with the node containing the matching prefix, that is, the data record pointed to by the D Field 36 pointer of that node. In the next step, however, the connection or branch connecting the single child node of the node to be deleted with the remainder of the tree must be preserved. This is accomplished by coalescing the prefix and branch character of the node to be deleted with the prefix of the child node, thereby creating a new node to replace both the node being deleted and the single child node dependent from that node. This new node, in effect, replaces the node that was deleted, and is pointed to by the branch pointer of the deleted nodes parent node that originally pointed to the deleted node.

Figure 5:
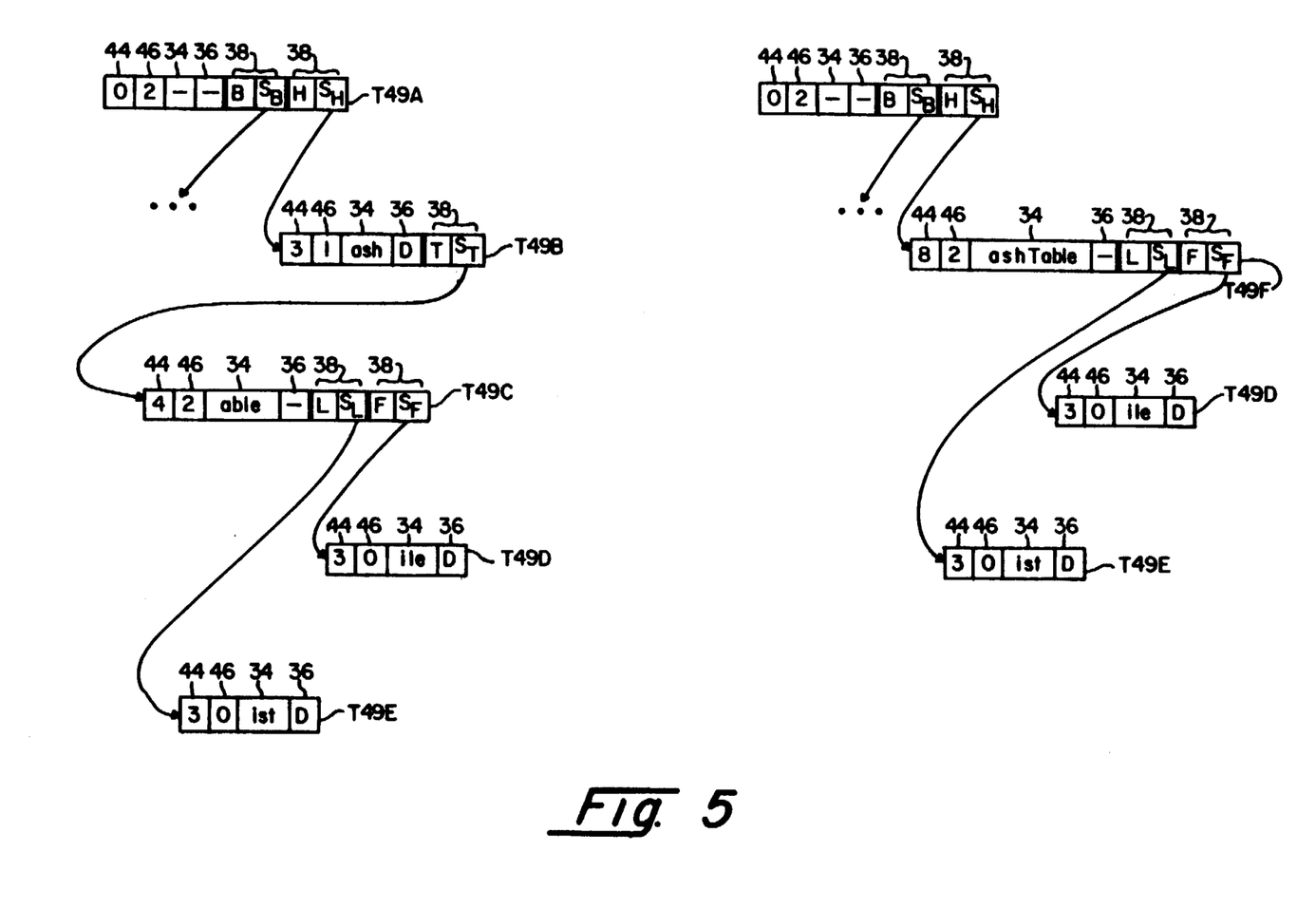

This deletion of a node having a single branch is illustrated in FIG. 5, wherein the left hand drawing represents the original tree, and the right hand drawing the tree after the deletion of a node. As illustrated, the tree includes a root node T 49A with two branches and thus two branch characters, "B" and "H", with their associated pointers. The "B" branch pointer $S_B$ goes to a branch which is not involved in the deletion operation, and which will not be discussed further. The branch dependent from the "H" branch character and pointed to by associated pointer $S_H$ contains the keys "Hash", "HashTable", "HashTableFile" and "HashTableList". Node T49B contains the key "Hash", through branch character "H" in node T 49A and prefix "ash" in its PF 34, and has a single branch, dependent from branch character "T" through associated branch pointer $S_T$, and a data record reference through a D Field 36 pointer. Node 49B and key "Hash" are to be deleted from the tree in this example.

Node 49B's branch pointer $S_T$ is to a node T 49C, which contains the prefix "able" and two branch characters, "L" and "F", with associated branch pointers $S_F$ and $S_L$ to nodes T 49D and T 49E respectively. Nodes T 49D and T 49E respectively contain prefixes "ist" and "ile" and D Field 36 pointers to data records.

In the deletion of node T 49B, the data record pointed to by T 49B's D Field 36 is located and deleted in the first step. Thereafter, T 49B and T 49C must be coalesced so as to preserve the keys and data record references of nodes T 49C, T 49D and T 49E, which are children of T 49B, and to maintain the links between the parent of T 49B, that is, T 49A, and T 49C, T 49D and T 49E. As illustrated in the right hand portion of FIG. 5, a new node T 49F containing the prefix "ashTable" is created, wherein this prefix is the coalition of prefixes "ash" from node T 49B and "Table" from node T 49C. Node T 49F has two branch characters, "L" and "F" from node T 49C, and associated branch pointers $S_L$ and $S_F$ to, respectively, nodes T 49D and T 49E. The branch pointer $S_H$ of T 49A pointing to the original, deleted node T 49B now points to new node T 49F, so that the links from node T 49A through to nodes T 49D and T 49E are preserved.

In a final case of deletion of a node, the node to be deleted will have more than one branch character to child nodes, that is, the prefix of that node to be deleted will occur as the leading characters of at least two other keys held in the search tree formed from that node and it subtrees. In this instance, only the data is deleted from the node, by deleting the nodes D Field 36 pointer to the data record associated with the key to be deleted. It is necessary to retain the prefix and branch characters of the node as this node forms the branch point between the two or more keys held in the subtrees of the node.

Further description of the above node deletion operations will be found in the following exemplary Delete Program Listing C.

PROGRAM LISTING C - NODE DELETION

```
procedure PDELETE(T,(K_1..K_k))
    // remove the key value (K_1..K_k) from the
        prefix search tree T.
        A tuple (i,d) is returned; i is false if K does
            not exist.
        Otherwise i is true and d is the data record
            pointer //
    if T=null then return(FALSE,null)
    X=T;Y=null;y=0;Z=null;z=0;j=0;n=0
    loop
        input node X from disk
        let X be defined by p,s,(P_1..P_p),D,
            ((B_1,S_1)..(B_n,S_n))
        // match the prefix to the leading characters
            in the key //
        if k-n<p then return(FALSE,null)
        for i=1 to p do
            n=n+1
            if K_n<>P_i then return(FALSE,null)
        end
        // does the key match the prefix? //
        if n=k then {
            if D=null then return(FALSE,null)
            d=D
        case
            s=0:call LEAF(X,y,Y,z,Z)
            s=1:call JOIN(X,y,Y)
            :else:D=null
```

-continued

PROGRAM LISTING C - NODE DELETION

```
            end
          return(TRUE,d) }
        // determine which node to process next.
           Search branch characters //
        n=n+1
        z=y;y=j;j=1
        loop
          case
            :j>s:return(FALSE,null)
            :K_n<B_j:return(FALSE,null)
            :K_n=B_j:exit
            :else:j=j+1
          end
        forever
        Z=Y;Y=X;X=S_j
      forever
                       LEAF
procedure LEAF(X,y,Y,z,Z)
   // The key has ended in a leaf node. We will de-
      lete this node, X, and the branch character,
      subtree pointer tuple, (B_y,S_y), in the par-
      ent node, Y, which led us here. //
   // assume X, Y, and Z are already in memory
      let Y define p,s,(P_1..P_p),D,((B_1,S_1)..
          (B_s,S_s))
      let Z define Zp,Zs,(ZP_1..ZP_Zp),ZD,((ZB_1,
          ZS_1)..(ZB_Zs,ZS_Zs)) //
   // destroy node X //
   KILLNODE(X);
   // create new node W to hold contents of Y, minus
      one subtree //
   if Y=null then {T=null;return}
   W=MAKENODE((P_1..P_p),(D),((B_1,S_1)..(B_y-1,
      S_y-1),(B_y+1,S_y+1)..(B_s,S_s)))
   // destroy node Y //
   KILLNODE(Y)
   // replace pointer to Y in Z with pointer to W //
   if Z=null then {T=W;return}
   ZS_z=W;output Z to disk
   return
end LEAF
                       JOIN
procedure JOIN(X,y,Y)
   // The key has ended in a node with one subtree.
      We will create a new node to replace both this
      node, X, and the root node of the subtree
      (B_1,S_1);
   // assume X, Y, and Z are already in memory
      let V define Vp,Vs,(VP_1..VP_Vp),VD,
          ((VB_1,VS_1)..(VB_Vs,VS_Vs))
      let X define p,s,(P_1..P_p),D,((B_1,S_1)
          ..(B_s,S_s)) //
      let Y define Yp,Ys,(YP_1..YP_Yp),YD,
          ((YB_1,YS_1)..(YB_Ys,YS_Ys)) //
   // read next node, from subtree, into memory //
   V=S_1;input node V from disk
   // create new node W to hold contents of X
      plus V, minus one subtree //
   W=MAKENODE((P_1..P_p,B_1,VP_1..VP_Vp),(VD),
      ((VB_1,VS_1)..(VB_Vs,VS_Vs)))
   // destroy node V,X //
   KILLNODE(X);KILLNODE(V)
   // replace pointer to X in Y with pointer to W //
   if Y=null then {T=W;return}
   YS_y=W;output Y to disk
   return
end JOIN
end PDELETE
```

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A computer-implemented method for searching an information tree of record keys with a search key to locate and retrieve one of a plurality of data records of a database held in the memory of a data processing system, wherein:

each of said record keys represents one of said data records and comprises a string of a plurality ("s") of characters, the number s of said characters differing for different ones of said record keys;

said search key comprises a string of a plurality ("k") of characters; and said tree comprises a plurality of linked information nodes held in said memory, wherein each of at least some of said nodes comprises:

(i) a first field holding a string of the i-th through p-th successive characters common to the all of the record keys represented by all of at least one subtree of said each of at least some of said nodes;

(ii) a second field holding a pointer to a data record for which said i-th through p-th successive characters represent a final portion of the respective record key; and (iii) a third field for each of said at least one subtree of said node and holding a (p+1)st record key character immediately following said pth character held in said first field, which (p+1)st record key character is common to all of the record keys represented by the respective one of said at least one subtree, said third field including a respective pointer to the root node of said respective one of said at least one subtree; said method being characterized by:

∅ for each one of said nodes, comparing the string of the i-th through p-th successive characters of said search key with the record key character string held in the first field of said node, and (1) if said search key string does not match said record key string, terminating said method, but (2) if said search key string matches said record key string, then (a) if k=p, retrieving from the memory a data record using the pointer held in the second field of said node, but (b) if k>p, comparing the (p+1)st search key character with the (p+1)st record key character held in each of the third fields of said node, and (i) if said (p+1)st search key character does not match any of said (p+1)st record key characters, terminating said method, but (ii) if said (p+1)st search key character matches one of said (p+1)st record key characters, then retrieving from the memory the root node for the respective subtree using the pointer held in the respective third field of the node holding said (p+1)st record key character, and returning to step ∅ to continue said method for the root node so retrieved.

* * * * *